United States Patent
Morris

[11] Patent Number: 5,897,126
[45] Date of Patent: Apr. 27, 1999

[54] COUPLING ASSEMBLY FOR A TRAILER HITCH

[76] Inventor: Dwight Morris, 2912 W. Madison, Springfield, Mo. 65802

[21] Appl. No.: 08/728,536

[22] Filed: Oct. 9, 1996

Related U.S. Application Data

[63] Continuation of application No. 08/396,653, Mar. 1, 1995, abandoned.

[51] Int. Cl.$^6$ .................................................. B60D 1/28
[52] U.S. Cl. ....................... 280/491.5; 280/507; 280/511; 403/109.1
[58] Field of Search .................................. 280/507, 511, 280/491.1, 491.2, 491.5, 482, 506, 414.1; 70/163, 167, 237, 258; 403/377, 104, 109.1

[56] References Cited

U.S. PATENT DOCUMENTS

| | | | |
|---|---|---|---|
| 2,170,983 | 8/1939 | Adams | 280/507 |
| 2,693,368 | 11/1954 | Petron | 403/104 |
| 3,226,133 | 12/1965 | Geresy | 280/507 |
| 3,271,005 | 9/1966 | Saunders | 280/507 |
| 3,284,101 | 11/1966 | Arnold | 280/482 |
| 3,326,573 | 6/1967 | Neitzey | 280/414.1 |
| 3,694,006 | 9/1972 | Good et al. | 280/511 |
| 3,782,761 | 1/1974 | Cardin, Sr. | 280/507 |
| 3,782,762 | 1/1974 | Nagy et al. | 280/507 |
| 3,884,055 | 5/1975 | Vuillemot | 280/507 |
| 3,889,981 | 6/1975 | Westford | 280/507 |
| 3,933,222 | 1/1976 | Craig | 403/109 |
| 4,040,641 | 8/1977 | Riecke | 280/507 |
| 4,082,311 | 4/1978 | Hamman | 280/507 |
| 4,388,012 | 6/1983 | Erickson | 403/142 |
| 4,596,484 | 6/1986 | Nakatani | 403/377 |
| 4,863,185 | 9/1989 | Coppe | 280/511 |
| 5,000,067 | 3/1991 | Kolbusz et al. | 280/507 |
| 5,184,840 | 2/1993 | Edwards | 280/507 |

*Primary Examiner*—Anne Marie Boehler
*Attorney, Agent, or Firm*—Blackwell Sanders Peper Martin

[57] ABSTRACT

A coupling assembly for a trailing hitch having a sleeve member mounted on a tongue of a trailer and constituting an extension thereof. A removable coupling member is detachably attached to a hitch, wherein the coupling member slidably engages with the sleeve member and is moveable between a rear locking position and a forward detaching position that detaches the coupling member from the sleeve member. A locking bar pivotally is mounted on the sleeve member, wherein when the coupling member is in the rear locking position and the locking bar is in the closed position, the locking bar lockingly engages the sleeve member and the coupling member. When the locking bar is in the open position and the hitch is detached, the removable coupling member can be detached from the sleeve member and stored.

2 Claims, 4 Drawing Sheets

COUPLING ASSEMBLY FOR A TRAILER HITCH

This application is Continuation of application Ser. No. 08/396,653; filed Mar. 1, 1995 now abandoned.

FIELD OF THE INVENTION

This invention relates to a coupling assembly for a trailer hitch, and more particularly, a compact, secure coupling assembly for detachably coupling or connecting a trailer to a towing vehicle.

BACKGROUND OF THE INVENTION

Trailer hitches are added to vehicles such as automobiles and pickup trucks to provide the capability of towing another vehicle such as a trailer.

U.S. Pat. No. 5,184,840 discloses a hitch protector which is end mountable on the receiving socket of the vehicle hitch and is retained by a retention pin. This protector can be removed when not in use.

U.S. Pat. No. 4,082,311 discloses a trailer hitch which has a socket member to grasp the trailer hitch ball while permitting pivotal movement of the trailer hitch assembly on the ball. A sleeve mechanism is used for locking the trailer hitch when the trailer is unattended.

Locking devices to prevent the theft of trailers are disclosed in U.S. Pat. Nos. 5,000,067, 3,884,055 and 3,782,762. These devices, however, as well as those described above fail to disclose the present invention.

SUMMARY OF THE INVENTION

The coupling assembly of the present invention comprises
(a) a sleeve member mounted on a tongue of a trailer and constituting an extension thereof,
(b) a removable coupling member detachably attached to a hitch, wherein the coupling member slidably engages with the sleeve member and is moveable between a rear locking position and a forward detaching position that detaches the coupling member from the sleeve member;
(c) a locking bar pivotally mounted on the sleeve member, wherein when the coupling member is in the rear locking position and the locking bar is in the closed position, and the locking bar lockingly engages the sleeve member and the coupling member, and, wherein, when locking bar is in the open position and the hitch is detached, the removable coupling member can be detached from the sleeve member and stored.

DETAILED DESCRIPTION OF THE INVENTION

Figure 1:
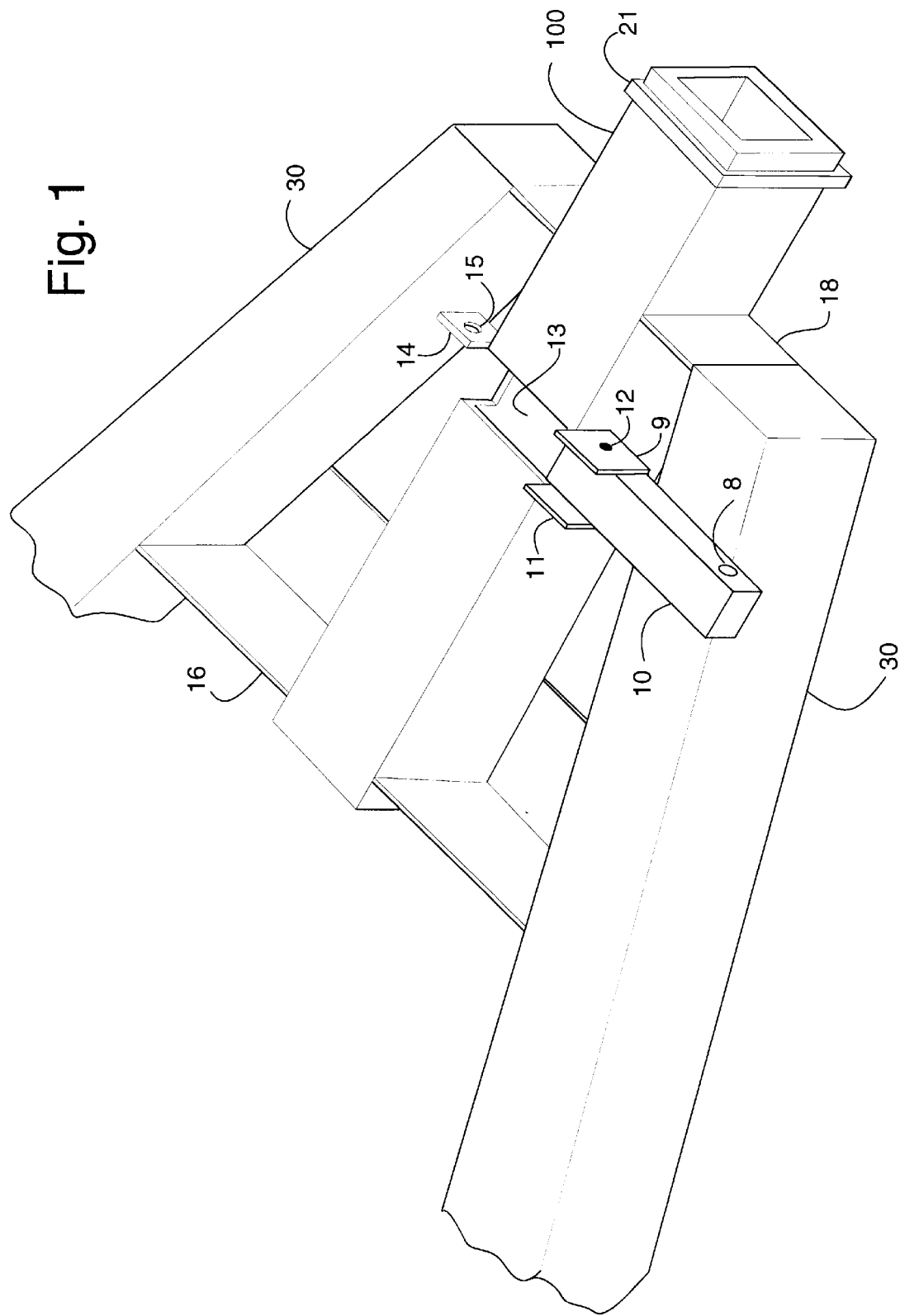
FIG. 1 is a side elevational view showing the sleeve member and a portion of the tongue of the towed vehicle. The locking bar is in the open position.

The trailer hitch assembly of this invention comprises a coupling assembly for detachably coupling or connecting a trailer unit to a towing vehicle. Referring to FIG. 1, the hitch assembly comprises a sleeve member 100 which is an elongated, generally quadrilateral square or rectangular steel tube, tongue extension member, with a locking bar 10 pivotally mounted on the sleeve member. The sleeve member 100 is preferably a 2.5×2.5×0.5 inch steel tube, approximately 16 inches long. Optionally, the sleeve member can have a bar reinforcer 21 which is a band of metal welded around the receiver tube for added strength. The sleeve member 100 is a forwardly projecting steel tube, which is mounted on the trailer hitch bars 30 by welding brackets 16 and 18 to the trailer hitch bars, said brackets are in turn welded to the sleeve member 100. The brackets 16 and 18 are preferably 2.5×2.5×0.25 inch angle iron. The sleeve member 100 thus constitutes an extension of the trailer tongue member.

Figure 2:
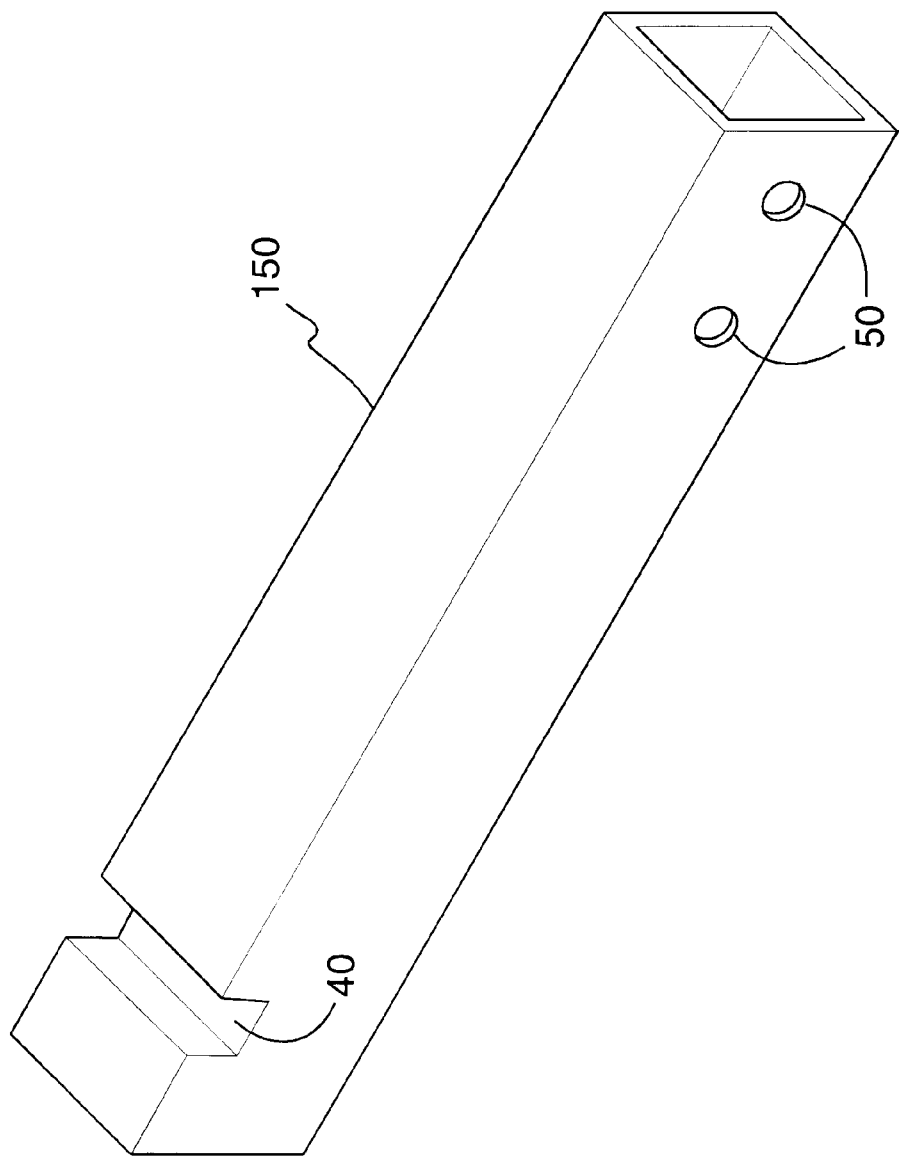
FIG. 2 is a side elevational view showing a linking member.

The locking bar 10 is pivotally mounted on the sleeve member 100 using tabs 9 and 11 which are welded to the side of the sleeve member 100 opposite each other. Preferably, the locking bar is a 1×0.5×4 inches with a 0.375 inch diameter hole bored at one end and a 0.25 inch diameter hole bored at the other end. The tabs 9 and 11 are preferably 1.125×0.75×0.187 inch with 0.375 inch diameter holes bored on one end. A pivot pin 12 extends rotatably through a bore in the locking bar 8, engages both tabs and is welded flush with the exterior of both tabs. The pin 12 is preferably 0.375 inch diameter by 0.875 inches long. The socket member 13 is formed in the sleeve member 100 preferably by cutting the bar crosswise to provide a recess or notch, preferably 0.56×0.5 inch, which accommodates the locking bar 10 when it is in the closed position. The locking tab 14, on the opposite side of the sleeve member 100 from the tabs 9 and 11, is preferably 1.125×0.75×0.187 inch with a 0.25 inch diameter hole bored on one end. When the locking bar is in the closed position, the bore 8 that extends through the end of the locking bar is aligned with the aperture 15 in the tab 14, so that the hasp 51 of a padlock 50 can be inserted through the aligned openings and locked, Referring to FIG. 2, the linking member 150 comprises a generally quadrilateral square or rectangular steel tube, sufficiently smaller than the tube used for the sleeve member, so that it slidably engages with the sleeve member, and easily inserts inside the sleeve member. Preferably, the linking member 150 is 2×2×0.25 inch tube that is 18 inches long. Likewise, the linking member is not so small as to loosely engage with the sleeve member, allowing the connection to be unstable. The linking member has a nesting socket member 40 which is formed in the linking member 150 preferably by cutting the bar crosswise to provide a recess or notch which also accommodates the locking bar 10 when it is in the closed position. The nesting socket member 40 is located on the linking member 150 so that when the coupling member 200 is in the rear locking position, the nesting socket member 40 aligns with the socket member 13, so that when the locking bar 10 is in the closed position, the locking bar lockingly engages the sleeve member 100 and the linking member 150. Preferably, the nesting socket member 40 is 0.56×0.5 inch and set 1.0 inch from the end of the linking member 150.

The linking member 150 has positioned at the end of the bar two through holes 50 which are used to attach the linking member 150 to the ball socket 250. Preferably, the through holes 50 are 0.5 inch in diameter, and are located about 3 inches apart and 1.5 inch from the end of the linking member 150.

Figure 3:
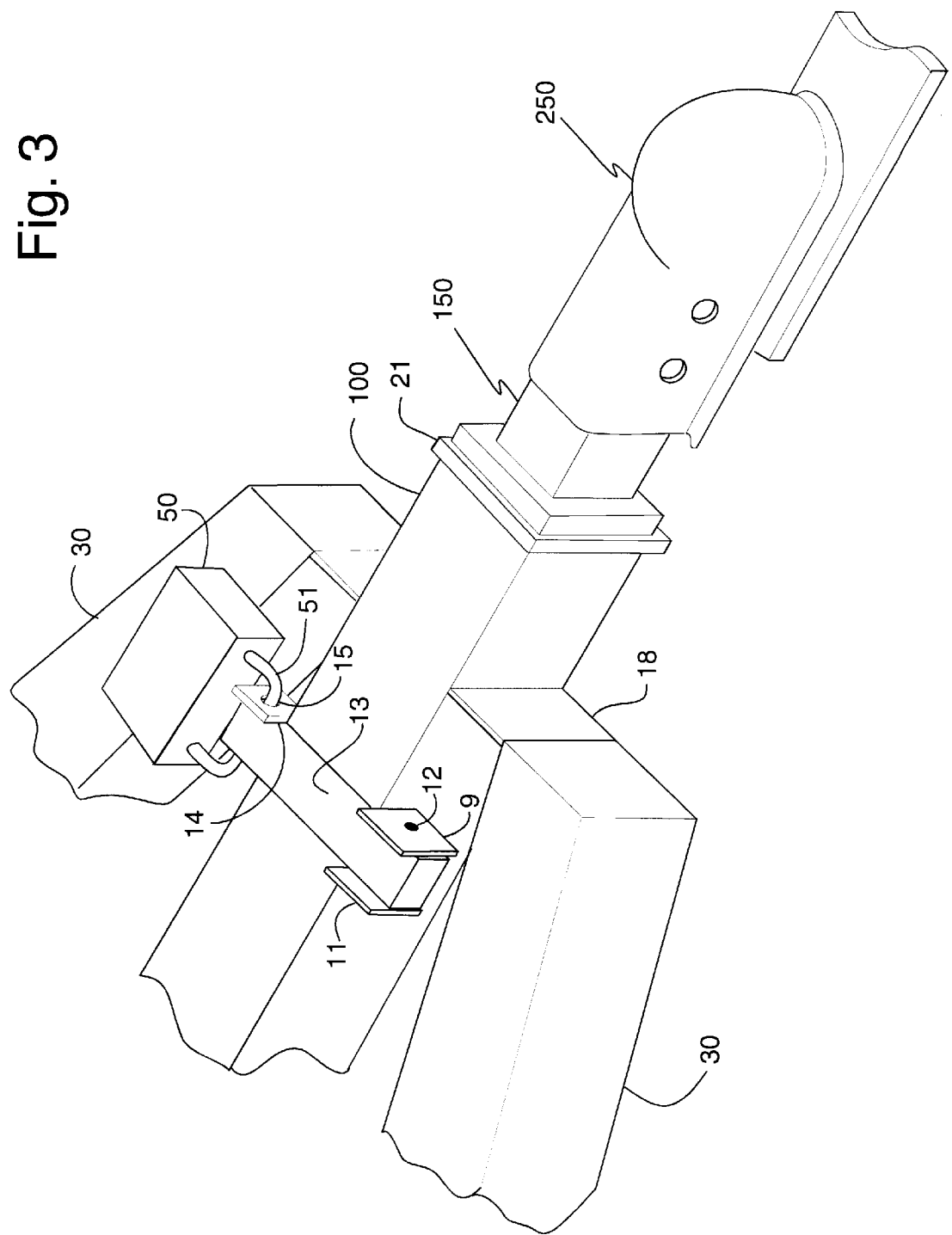
FIG. 3 is a side elevational view showing the sleeve member engaged with the removable coupling member, where the coupling member is in the rear locking position, the locking bar is in the closed position, and the sleeve member and the coupling member are locked together.

Referring to FIG. 3, the coupling member 150 is lockingly engaged with the sleeve member 100. The coupling member 150 is in the rear locking position. The locking bar 10 is in the closed position, so that bore 8 is aligned with aperture 15.

Figure 4:
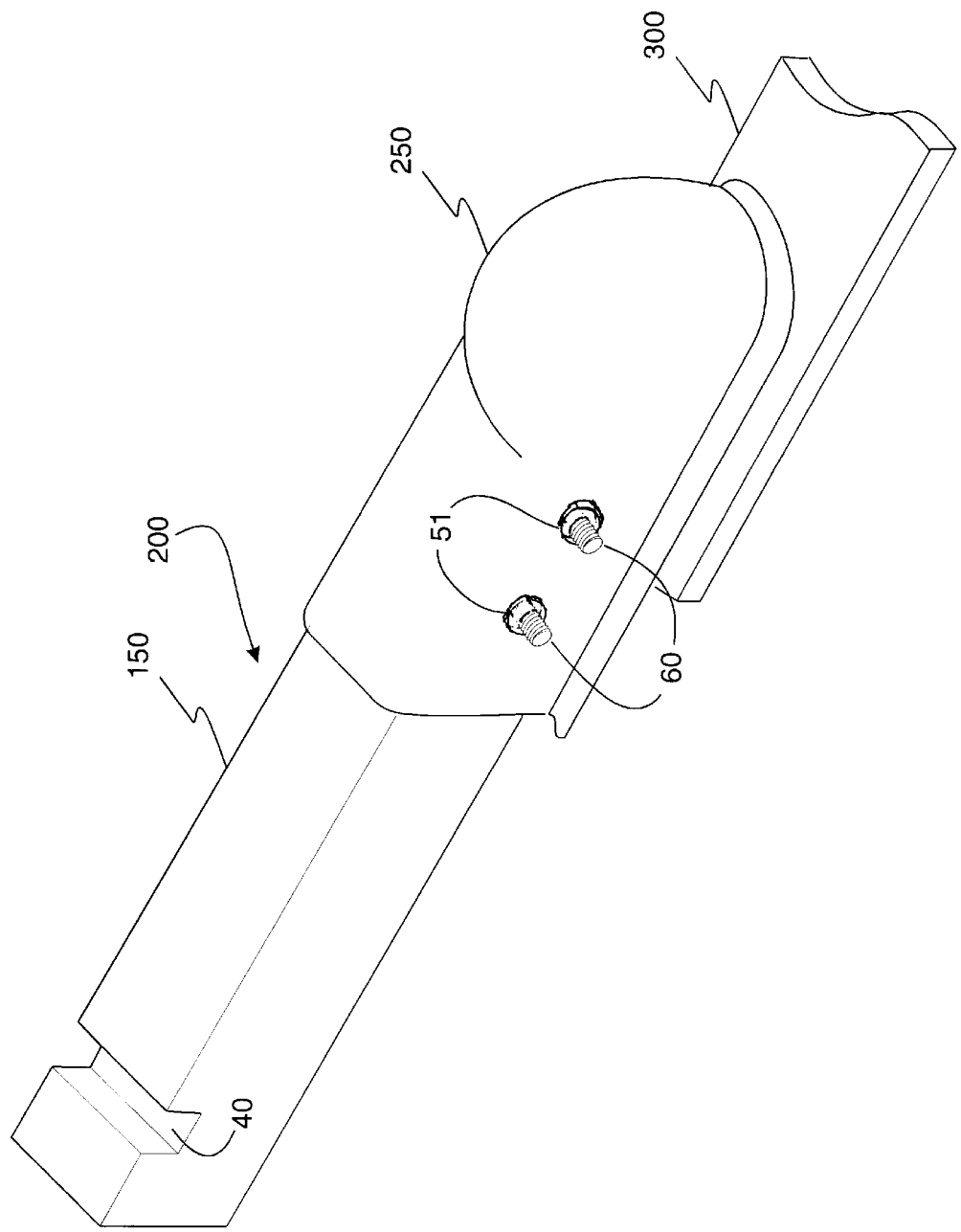
FIG. 4 is a side elevational view showing the removable coupling member detachably attached to a hitch.

Referring to FIG. 4 the coupling member 200 is detachably attached to the hitch 300. The linking member 150 is inserted into the ball socket 250 and held in place by two bolts 60, inserted through aligned apertures 50 and 51, through the linking member 150 and ball socket 250, respectively. Optionally, the bolts 60 and apertures 50 and 51 can be eliminated and the linking member 150 can be welded to the ball socket 250.

When it is desired to unhitch the trailer, the ball socket 250 is detached from the hitch 300. The padlock 50 is unlocked, and the hasp 51 is removed from the aperture 15, the locking bar 10 is moved to the open position, and the coupling member 200 is moved to the forward open position and detached from the sleeve member 100.

The materials of construction are selected to have a high test strength, and weather-resistant. Materials such as iron, steel, stainless steel, and certain polymers such as reinforced polycarbonate or ABS are included. Coatings, such as paints and lacquers can be used to protect the materials from rust or corrosion. The preferred material of construction is steel.

The parts can be bonded together by means such as adhesive, epoxy, hot melt adhesive or welding. The preferred method of bonding is welding.

Thus, there is seen to be provided, in combination with a vehicle and a trailer, a coupling assembly for coupling the trailer to the vehicle, comprising a sleeve member mounted on a tongue of the trailer and constituting an extension thereof; and a removable coupling member detachably attached to a hitch carried by the vehicle. The coupling member slidably interengages the sleeve member and is moveable between a rear locking position and a forward detaching position that detaches the coupling member entirely from the sleeve member for disengagement completely from the trailer. A locking bar is pivotally mounted on the sleeve member, the locking bar being selectively swingable laterally across an axis of elongation of the sleeve member between a closed, locking position engaging the coupling member in locked relation and an unlocked position disengaging the coupling member, wherein when the coupling member is in the rear locking position and the locking bar is in the closed position, the locking bar lockingly engages the sleeve member and the coupling member for retention, and whereby when the locking bar is in the open position, the removable coupling member can be detached from the trailer and stored, thereby leaving the trailer without provision for being towed by another vehicle.

I claim:

1. In combination with a trailer and a vehicle, a coupling assembly for coupling the trailer to the vehicle, comprising:

(a) a sleeve member mounted on a tongue of the trailer and constituting an extension thereof;

(b) a removable coupling member detachably attached to a hitch carried by the vehicle, wherein the coupling member slidably interengages the sleeve member and is moveable between a rear locking position and a forward detaching position that detaches the coupling member completely from the sleeve member for disengagement entirely from the trailer;

(c) a locking bar pivotally mounted on the sleeve member, the locking bar being selectively swingable laterally across an axis of elongation of the sleeve member between a closed, locking position engaging the coupling member in locked relation and an unlocked position disengaging the coupling member, wherein when the coupling member is in the rear locking position and the locking bar is in the closed position, the locking bar lockingly engages the sleeve member and the coupling member for retention, and whereby when locking bar is in the open position, the removable coupling member can be detached from the trailer and stored, thereby leaving the trailer without provision for being towed by another vehicle;

wherein the assembly is constructed of material selected from the group consisting of steel or stainless steel;

wherein the sleeve member is mounted on the trailer by welding;

wherein the coupling member is made of a linking member and a ball socket welded together;

wherein the locking bar is made of a steel bar; and wherein the locking bar pivots on a steel pin mounted to one side of the sleeve member, the assembly further comprising a locking structure on an opposite side of the sleeve member for locking securement of the locking bar.

2. In combination with a trailer and a vehicle, a coupling assembly for coupling the trailer to the vehicle, comprising a ball hitch assembly attached to vehicle, the hitch assembly including a removable coupling member for engaging the ball hitch assembly, the coupling assembly comprising a sleeve member mounted on a tongue of the trailer and constituting an extension of the tongue, the coupling member slidably interengaging the sleeve member, the coupling member being moveable between a rear locking position and a forward detaching position that detaches the coupling member completely from the sleeve member for disengagement entirely from the trailer, a locking bar pivotally mounted on the sleeve member, the locking bar being selectively swingable laterally across an axis of elongation of the sleeve member between a closed, locking position engaging the coupling member in locked relation to the sleeve member and an unlocked position disengaging the coupling member from the sleeve member, the locking bar lockingly engaging the sleeve member and the coupling member for retention when the coupling member is in the rear locking position and the locking bar is in the closed position, and whereby when the locking bar is in the open position, the removable coupling member can be detached from the trailer and stored, thereby leaving the trailer without provision for being towed by another vehicle, the locking bar pivoting on a pin mounted to one side of the sleeve member, the assembly further comprising a locking structure on an opposite side of the sleeve member for locking securement of the locking bar.

* * * * *